United States Patent
Reilama et al.

(10) Patent No.: US 10,415,183 B2
(45) Date of Patent: Sep. 17, 2019

(54) METHOD OF PRODUCING REGENERATED CELLULOSE AND HEMICELLULOSE

(71) Applicant: Metsä Fibre Oy, Metsä (FI)

(72) Inventors: Ismo Reilama, Metsä (FI); Esko Turunen, Metsä (FI)

(73) Assignee: Metsä Spring Oy, Espoo (FI)

( * ) Notice: Subject to any disclaimer, the term of this patent is extended or adjusted under 35 U.S.C. 154(b) by 666 days.

(21) Appl. No.: 14/784,457

(22) PCT Filed: Apr. 15, 2014

(86) PCT No.: PCT/FI2014/050273
§ 371 (c)(1),
(2) Date: Oct. 14, 2015

(87) PCT Pub. No.: WO2014/170546
PCT Pub. Date: Oct. 23, 2014

(65) Prior Publication Data
US 2016/0032021 A1 Feb. 4, 2016

(30) Foreign Application Priority Data

Apr. 15, 2013 (FI) .................................. 20135366

(51) Int. Cl.
*C08H 8/00* (2010.01)
*D21C 9/08* (2006.01)
(Continued)

(52) U.S. Cl.
CPC ............ *D21C 9/08* (2013.01); *C08B 16/00* (2013.01); *C08B 37/0003* (2013.01);
(Continued)

(58) Field of Classification Search
CPC .................................. D21C 9/08; C08B 37/13
See application file for complete search history.

(56) References Cited

U.S. PATENT DOCUMENTS

| | | | |
|---|---|---|---|
| 5,858,021 A | 1/1999 | Sun et al. | |
| 2003/0157351 A1* | 8/2003 | Swatloski | C08B 1/003 428/478.4 |

(Continued)

FOREIGN PATENT DOCUMENTS

| | | |
|---|---|---|
| CN | 101298620 A | 11/2008 |
| WO | 2005098546 A2 | 10/2005 |

(Continued)

OTHER PUBLICATIONS

Janzon et al., Upgrading of paper-grade pulps to dissolving pulps by nitren extraction:properties of nitren extracted xylans in comparison to NaOH and KaOH xylans, Aug. 2007, Cellulose, 15, p. 161-175.*

(Continued)

*Primary Examiner* — Anthony Calandra
(74) *Attorney, Agent, or Firm* — McCormick, Paulding & Huber LLP

(57) ABSTRACT

A method of producing regenerated cellulose and hemicellulose from a fiber pulp which is prepared by using chemical cooking. Hemicellulose and, correspondingly, cellulose is separated from the pulp, in order to form separate fractions, by dissolving them in such a solvent or an aqueous solution of it, from which they are precipitated by adding water, after which the regenerated hemicellulose and cellulose can be recovered. Hemicellulose-containing pulp, which for example is used as raw material of paper, can be efficiently fractionated into polymeric hemicellulose-rich fractions and very pure cellulose fractions, such as regenerated cellulose fiber, various cellulose particles or cellulose films.

27 Claims, 1 Drawing Sheet

(51) Int. Cl.
| | |
|---|---|
| *D21C 9/00* | (2006.01) |
| *C08B 16/00* | (2006.01) |
| *C08B 37/00* | (2006.01) |
| *C08B 37/14* | (2006.01) |
| *D21C 3/00* | (2006.01) |
| *D21C 3/20* | (2006.01) |
| *D01D 1/02* | (2006.01) |
| *D01F 2/02* | (2006.01) |

(52) U.S. Cl.
CPC .......... *C08B 37/0057* (2013.01); *C08B 37/14* (2013.01); *C08H 8/00* (2013.01); *D01D 1/02* (2013.01); *D01F 2/02* (2013.01); *D21C 3/00* (2013.01); *D21C 3/20* (2013.01); *D21C 9/00* (2013.01)

(56) References Cited

U.S. PATENT DOCUMENTS

| | | | |
|---|---|---|---|
| 2004/0020854 A1 | 2/2004 | Ali et al. | |
| 2008/0190013 A1 | 8/2008 | Argyropoulos | |
| 2009/0088564 A1 | 4/2009 | Luo et al. | |
| 2010/0162541 A1* | 7/2010 | Luo | D04H 1/4258 28/105 |
| 2014/0048223 A1* | 2/2014 | Li | D21C 3/04 162/60 |

FOREIGN PATENT DOCUMENTS

| | | |
|---|---|---|
| WO | 2007065969 A1 | 6/2007 |
| WO | 2008098032 A2 | 8/2008 |
| WO | 2011/154967 A1 | 12/2011 |
| WO | 2012/080702 A2 | 6/2012 |
| WO | WO 2013171364 A1 * 11/2013 ............. C08B 1/003 |

OTHER PUBLICATIONS

Kim Anh Le et al. "Influence of Water on Cellulose-EMIMAc Solution Properties: A Viscometric Study" France. Springer Science and Business Media B.V. Nov. 1, 2011. pp. 45-54.

English Translation of Chinese Search Report for Chinese Patent Application No. 201480021375.4 dated Aug. 1, 2016.

Carmen Froschauer, et al."Dialkyl Phosphate-Related Ionic Liquids as Selective Solvents for Xylan" Austria. Biomacromolecules May 16, 2012. pp. 1973-1980.

International Search Report for PCT/FI2014/050273, dated Sep. 17, 2014.

M. Mazza et al.: "Influence of water on the dissolution of cellulose in selected ionic liquids," Cellulose (2009), vol. 16, pp. 207-215.

Sixta, Herbert "Handbook of Pulp," 2006.

* cited by examiner

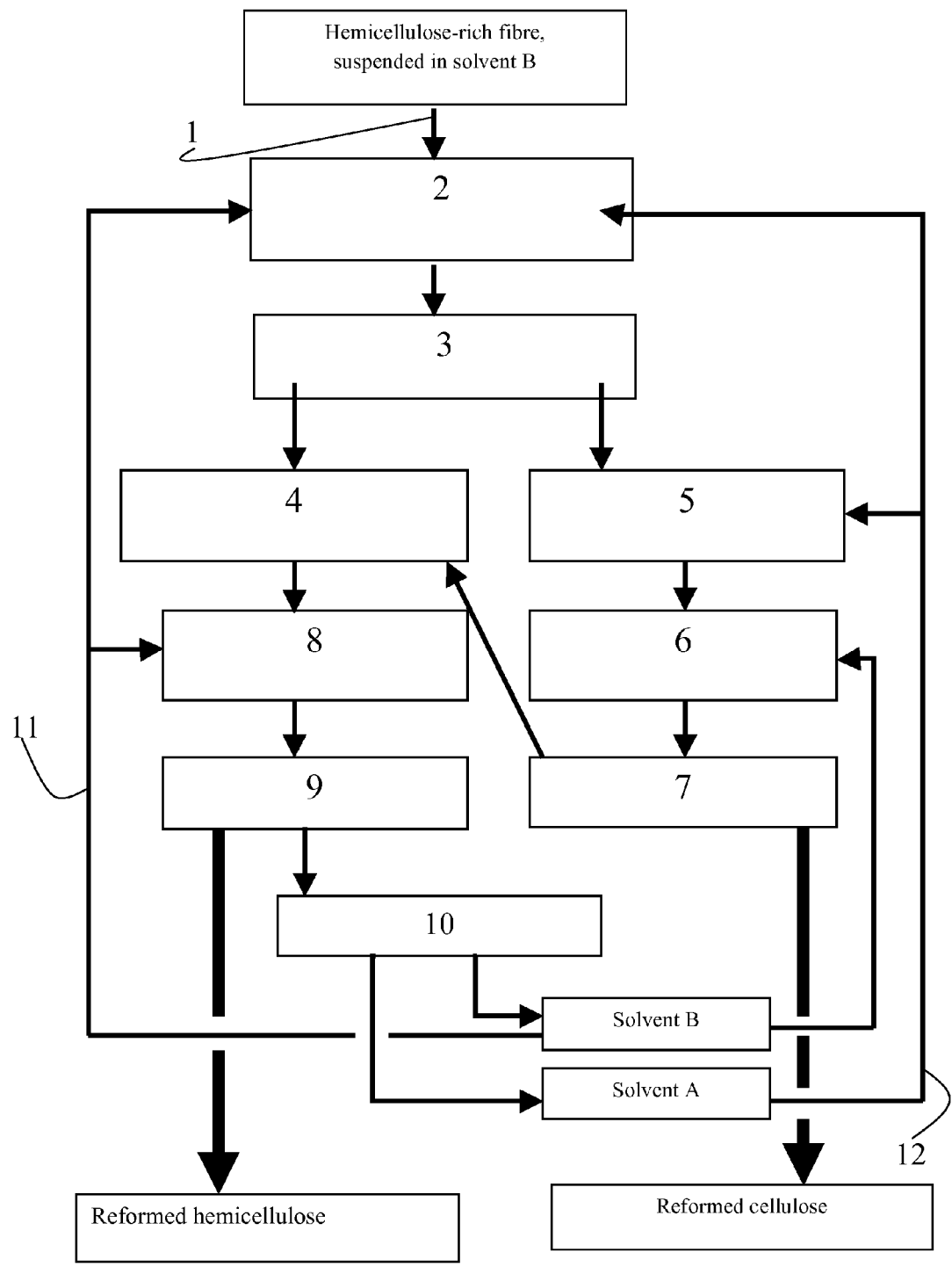

METHOD OF PRODUCING REGENERATED CELLULOSE AND HEMICELLULOSE

CROSS REFERENCE TO RELATED APPLICATIONS

This application is entitled to the benefit of and incorporates by reference subject matter disclosed in International Patent Application No. PCT/FI2014/050273 filed on Apr. 15, 2014 and Finnish Patent Application No. 20135366 filed on Apr. 15, 2013.

TECHNICAL FIELD

The present invention relates to production of regenerated cellulose and hemicellulose.

In particular, the present invention relates to the method according to the preamble of claim 1 of isolating cellulose and hemicellulose from a fibre pulp, which is produced by chemical cooking and which comprises cellulose and hemicellulose, such as from chemical pulp that is prepared from wood or grasses.

The present invention also relates to the method according to the preamble of claim 7 of treating fibre pulp.

BACKGROUND ART

Dissolving pulp is generally used in the production of viscose fibres and other textile fibres, as well as different further processed products which demand high chemical purity. Traditionally, it is required that the dissolving pulp has a high percentage of cellulose ("alpha-cellulose") and is reactive towards various derivatising chemicals, such as carbon disulphide.

Generating high alpha-cellulose content means removing particularly the lignin and the hemicellulose material (xylan and glucomannan) from the fibres. The removal of lignin takes place in the same way as happens during the production of chemical pulp in general: by cooking lignocellulose-containing raw materials together with chemicals that remove the lignin, under conditions which are typical for each process, and which can be divided into, for example alkaline, acidic or solvent-based (organosolv) cooking methods. It is also possible to combine different cooking reaction steps which remove the lignin, referred to as multi-stage cooking. Lignin removal is completed in follow-up processes (oxygen delignification and bleaching), in which the fibre suspension generated during the cooking is treated with various lignin-removing chemicals, such as oxygen, chlorine dioxide, ozone, chlorine, hypochlorite and hydrogen peroxide.

For the removal of the hemicelluloses, many known processes have been used in the industry already for decades, which processes have been described in detail, among others, by Herbert Sixtan in his *Handbook of Pulp* (2006).

Alkaline extraction of sulphate pulp is also a known method, which is described in several patent applications, such as WO publication 2007/065 969.

Many of the manufacturing processes of dissolving pulp (viscose pulp) are based on sulphite cooking. Generally, in sulphite pulp mills, increasing the percentage of alpha-cellulose takes place in such a way that hemicelluloses are removed in association with bleaching, during the "hot alkali stage", by using diluted NaOH solutions as reagents, and under conditions of high temperature.

There are also cooking processes in which it is possible to achieve the desired percentage of alpha-cellulose already during the cooking Such methods are based on multi-stage sulphite cooking or prehydrolysis sulphate cooking.

In the sulphite methods, the chemicals and especially the pH of the different cooking steps are varied appropriately. In prehydrolysis sulphate cooking, in the beginning of the process there is a special acidic hydrolysis step, in which the pH of the wood chips is brought down to a low level by using steam, water or an acid solution. Bleaching of the prehydrolysis pulp does not necessarily require a separate step at all for removing the hemicelluloses. The prehydrolysis sulphate cooking is so close to the basic sulphate process used in paper pulp production that application of it does not require a radically different technology, compared to the production of paper pulp.

A disadvantage of the prehydrolysis sulphate process is that the selectivity regarding the cellulose is compromised as the intensity of the hydrolysis is increased. This results in the consumption of wood per tonne of dissolving pulp produced becoming uneconomically high. It is possible to improve the selectivity by selecting milder conditions for the hydrolysis step, in which case not as much hemicelluloses as is theoretically possible is removed during the hydrolysis. However, a lower level of removal of hemicelluloses means that in order to achieve the desired alpha-cellulose content, the removal of hemicelluloses must be continued, for example by means of a hot-alkali-step or a cold-alkali-step, which is carried out in association with the bleaching process.

Today, the importance of hemicellulose as a biopolymer material is of increasing interest. In particular, there are new ways of using polymeric hemicellulose, for example by means of derivatisation.

As described above, traditionally the hemicellulose has had to be removed from the fibre pulp before it can be used for dissolving pulp applications. Treatments which have been carried out under hydrolysing conditions have, however, resulted in degradation of the hemicelluloses, and as a result, the percentage of polymeric material is quite small.

The publication WO 2008/098 032 describes a method, in which lignocellulose raw material, which comprises, among others, cellulose and hemicellulose, is completely dissolved in an ionic liquid. This liquid comprises almost no or only a very small amount of water. Cellulose and hemicellulose are precipitated from the ionic liquid, for example by adding water. The publication does not describe any methods of separating cellulose and hemicellulose from each other. For this reason, the regenerated lignocellulose material that is produced using this method is not pure cellulose, instead it also comprises hemicellulose. To precipitate the hemicellulose from the circulated ionic liquid, acetonitrile or THF is added into the liquid.

In an article from year 2009, Mazza et al. describe the importance of water for the solubility of cellulose in various ionic liquids (Mazza et al. *Cellulose* 2009, vol. 16, No. 2, pp. 207-215). The authors carried out experiments to determine how much water could be added into cellulose solution, in which the solvent was an ionic liquid. The publication makes no mention of how the water content affected the other dissolved components.

Froschauer et al., in *Biomacromolecules* 2012, 13, 1973-1980, describe a solvent which can be used to selectively dissolve xylan from a hemicellulose-rich pulp. They make no mention at all of the significance of the water content.

SUMMARY

The purpose of the present invention is to eliminate disadvantages associated with the known technology and to generate a completely new solution of producing regenerated (i.e. "reformed") polymeric hemicellulose and, correspondingly, regenerated cellulose, in the same mill.

The present invention is based on the idea that a fibre pulp which comprises hemicellulose and cellulose can be fractionated into hemicellulose and cellulose by using one and the same cellulose solvent, such as an ionic liquid or its aqueous solution, in which case the concentration of the solvent is adjusted by changing the water content, always depending on which component is to be dissolved. The prior art has not exploited the fact that an organic solvent, such as NMMO or IL, forms, together with water, a solvent system, which within a given range of water content selectively dissolves hemicellulose, and correspondingly within another range of water content it dissolves cellulose.

In the present invention, from a fibre pulp which has, for example, a high hemicellulose content, the hemicellulose and, correspondingly, the cellulose, are separated to form separate fractions by dissolving them into such a solvent or its aqueous solution, from which they are precipitated—each from its own solution—by adding water into the solution, after which the regenerated hemicellulose and cellulose can be recovered.

More specifically, the method, according to the present invention, of producing regenerated hemicellulose and cellulose is characterised by what is stated in the characterising part of claim 1.

The method of treating fibre pulp, in turn, is characterised by what is stated in the characterising part of claim 7, and the method of fractionating the fibre pulp by what is stated in the characterising part of claim 30.

Considerable advantages are achieved with the present invention. Thus, in the present method, hemicellulose-containing pulp, which is traditionally used as paper raw material, can be efficiently fractionated into polymeric hemicellulose-rich fractions and very pure cellulose fractions, such as regenerated cellulose fibre, different cellulose particles or cellulose film. Unlike the conventional chains for producing cellulose polymer, the present method also makes it possible to increase the percentage of both glucomannan and xylan in the hemicelluloses in the intermediate product pulp, by modifying traditional pulp cooking by means of methods which are known per se, such as polysulphide cooking. In this way, it is possible to significantly increase the yield of wood raw material in the form of hemicellulose-based and cellulose-based material products, compared to the current production chains.

The use of ionic liquids and similar cellulose solvents for example in the regenerated fibre production chain, in the way described here, is in principle possible in such business units, which are currently producing regenerated cellulose fibres (cf. viscose mills). A mill which produces chemical cellulose pulp offers an industrial infrastructure, an economy of scale and a possibility to develop, based on the hemicellulose fraction, new value chains and to make more efficient, as described above, the use of wood raw material. The present method enables the adapting of such a pulp mill in order to produce regenerated hemicellulose and cellulose products. The pulp mill can become for example a producer of cellulose staple fibre. A pulp mill can be further developed into a biorefinery, that is to say in one and the same production unit it is possible to produce side by side a variety of biopolymers, for example both polymeric hemicelluloses and regenerated cellulose products.

Dissolving and regenerating of cellulose, carried out in a pulp mill is particularly advantageous also because the intermediate products: hemicellulose-rich fibre pulp or hemicellulose-poor fibre pulp, do not need to be dried because logistics do not require it. This avoids keratinisation of the fibre. The fibre structure remains open, allowing access of the solvent into the fibre wall through the porous structures of the fibre, and making the dissolving more efficient.

Dissolving of cellulose, without prior derivatisation, using the direct dissolution method and using the above-mentioned cellulose solvents, in turn, simplifies the process and the apparatus required for its implementation, for example, compared to the traditional viscose method.

The pulp mill environment offers the opportunity, in traditional pulp bleaching unit processes (such as in the peroxide, ozone and hypochlorite stages, as well as by acidification for example with sulphuric acid), to adjust the viscosity of the cellulose to correspond to the needs of the cellulose product produced in each case.

In the following, preferred embodiments are described.

BRIEF DESCRIPTION OF THE DRAWING

The accompanying picture shows a basic drawing of the flow chart of one embodiment.

DETAILED DESCRIPTION

The present invention exploits, on the one hand, the ability of a cellulose solvent, such as an ionic liquid, to dissolve all the hemicelluloses in wood-based pulp fibre, and on the other hand, exploits the observation that it is possible to control, for example, the ability of an ionic liquid to dissolve hemicellulose and cellulose, by controlling the water content of the ionic liquid. These phenomena can be used, in accordance with the present invention, for the fractionating of these two bio-based polymers, and be used for dissolving and re-precipitating of material.

Based on the above, regenerated (or "reformed") cellulose and hemicellulose can be produced with a method, in which the hemicellulose and, correspondingly, the cellulose are separated from the fibre pulp, to form separate fractions. This is carried out by first dissolving the hemicellulose and, correspondingly, the cellulose, into a water-miscible cellulose solvent or its aqueous solution, in order to generate such a first solution that comprises, as dissolved polysaccharide, mainly hemicellulose, and to generate such a second solution that comprises, as dissolved polysaccharide, mainly cellulose. This can be achieved by setting the water content of the first dissolving solution higher than the water content of the second solution.

Hemicellulose and, correspondingly, cellulose, are precipitated from these solutions by increasing the water content of the solutions, in which case regenerated hemicellulose and, correspondingly, regenerated cellulose, are generated.

In one embodiment, N-methylmorpholine-N-oxide is used as the water-miscible organic cellulose solvent.

In another embodiment, an ionic liquid is used as the cellulose solvent. Examples of these are: [bmim]Cl, (1-butyl-3-methyl-imidazolium chloride), [emim][OAc] (1-ethyl-3-methyl-imidazoliumacetate) or [emim][Me$_2$PO$_4$] (1-ethyl-3-methyl-imidazolium-dimethylphosphate), and mixtures thereof.

Other examples of ionic liquids include conjugated acids, which are comprised of an organic base, such as 1,1,3,3-tetramethyl guanidine (TMG), 1,1,2,3,3-pentamethyl guanidine (PMG) or 1,8-diazabicyclo[5.4.0]undec-7-ene (DBU), which comprises inorganic or organic conjugated acids, such as propionic acid (and other carboxylic acids), hydrochloric acid, methyl dihydrogen phosphonate, dimethyl hydrogen phosphate or phosphinic acid.

The solvents described above are suitable for all the embodiments, which are described above.

The hemicellulose which is produced with the present method can be polymeric, preferably its molar mass is higher than 5,000 g/mol, most suitably higher than 10,000 g/mol, more preferably higher than 15,000 g/mol. The molar mass of hemicellulose can be, for example 17,500 g/mol-50,000 g/mol. Typically, the polydispersivity of polymeric hemicellulose is 1-5, for example 1.2-4.0.

Depending on what fibre raw material is used, the hemicellulose comprises branched or linear polysaccharide polymers, such as arabinoxylan, glucuronic acid-xylan, galactoglucomannan and glucomannan. Typical hemicelluloses are xylans and glucomannans.

From the cellulose which is precipitated from the solution, associated with the precipitation, products are formed, such as fibres, beads and different particles or films. Naturally, it is possible to produce two or more such products. In particular, cellulose fibres, cellulose beads, cellulose particles and/or cellulose films, are produced.

It actually is possible to carry out the precipitation using a traditional spinning nozzle directed into a precipitation basin, the water content of which is suitable for the cellulose precipitation.

A more preferred embodiment of treating the pulp fibre comprises several steps. They can be carried out in series and partly in parallel. Most suitably, the steps are performed in one and the same factory. In particular, an ionic liquid is used as the cellulose solvent.

Accordingly in a first step, the solid particles in the first liquid phase are brought into contact with a solvent, which comprises an organic solvent or an ionic liquid that has a first concentration relative to water, in order to dissolve the hemicellulose into the liquid phase, resulting in
a solid matter, which is mainly comprised of cellulose, and
a second liquid phase, which is mainly comprised of dissolved hemicellulose.

For the water content in the first dissolving step to be suitable, in a more preferred embodiment, the fibre pulp to be treated is dried to a dry matter content of maximum 52%, and the pulp is thickened to a dry matter content of 30-52%, preferably to a dry matter content of over 40%, before bringing it into contact with the solvent.

As described above, more preferably, the fibre pulp which is brought to the first dissolving step, is never dried, in order to avoid possible keratinisation.

The second liquid phase, which comprises hemicellulose, is brought to the second step, in which the dissolved hemicellulose is precipitated from the solvent, which comprises ionic liquid that has a second concentration relative to water, in which case the said second concentration is lower than the first concentration.

The solid matter which comprises cellulose is, in turn, brought to a third step where it is brought into contact with a solvent which comprises ionic liquid that has a third concentration relative to water, in order to dissolve the solid matter into the liquid phase, in which case the said third concentration is higher than the first concentration, and in which case a third liquid phase is generated, the dissolved solid matter of which is mainly cellulose.

Finally, the third liquid phase that comprises dissolved solid matter is brought to the fourth step, where the dissolved solid matter is precipitated from the solvent, which comprises ionic liquid that has a fourth concentration relative to water, in which case the said fourth concentration is lower than the first concentration, but higher than the second concentration.

It is essential for the application that a solvent which comprises the same ionic liquid, which possibly comprises water, is used in the first, second, third and fourth step. The concentration of this ionic liquid in the solvent is adjusted by increasing or decreasing the amount of ionic liquid, increasing or decreasing the amount of water or by a combination of these measures.

More preferably, the water content of the solvent comprising ionic liquid is
in the first step, higher than 11% but lower than 23%,
in the second step, higher than 24%,
in the third step, 10% or lower,
in the fourth step, 10-20%.

Most suitably, the hemicellulose is recovered from the precipitate in the third step, and the cellulose is recovered from the precipitate in the fourth step.

The liquid phase, which comprises hemicellulose and which is obtained from the first step is, in turn, preferably and typically ultrafiltrated. As a result, the hemicellulose is separated and concentrated into the retentate. The concentration of the solvent in the retentate, relative to the ionic liquid, is changed in order to precipitate the hemicelluloses.

Solvent and water are recirculated in the process.

In one embodiment, where the solvent is separated from the solid matter, the separated solvent is divided into ionic liquid and water, and the ionic liquid is recirculated into the solvent in the second step, and possibly in the first and the fourth step, too. The water, in turn, is returned into the solvent in the third step, and possibly in the first and the second step, too.

A more preferred application is shown in the accompanying FIGURE.

As shown in the FIGURE, in the application of the present method, the fibre pulp 1, which acts as the initial material, is brought into contact 2 with the solvent mixture AB1, for example in a mixing tank. The solvent mixture is comprised of a solvent A, which is an ionic liquid, and B, which is water. The mixture ratio is selected suitably to render the solvent mixture capable of selectively dissolving hemicelluloses.

In one preferred embodiment, an initial material pulp, which is rich in hemicelluloses, is thickened in order to ensure that the amount of solvent B remains within a dry matter percentage range of 30-52%, preferably to a dry matter percentage of over 40%, before it comes into contact with solvent A.

Contact between the fibre pulp and the solvent mixture AB1 lasts for at least 10 minutes and typically takes place at a fibre consistency of 8-15%.

After that, a main part of this solvent mixture AB1 and hemicelluloses which are dissolved into the mixture, are separated from the fibre pulp 3 and directed to further treatment 4. After concentration, the fibre pulp is brought into contact 5 with the mixture AB2, which comprises the same solvents A and B, which mixture is capable of dissolving the cellulose in the fibre pulp and the hemicelluloses which have not been dissolved in the preceding treatment.

Separation of the solvent mixture AB1 from the fibre pulp is carried out, for example, by compressing the suspension formed of the fibre pulp and the solvent mixture to a dry matter percentage of 30-52%, preferably to a dry matter percentage of over 40%.

The solution which is obtained from step 5 is directed into the space 6, where the mixture AB3, which is formed of solvents A and B, is held, and when the cellulose, which has been dissolved, comes into contact with the mixture, the cellulose is precipitated, and the hemicellulose, which has been dissolved, mainly remains dissolved in the solution. After that, the precipitated cellulose is separated in step 7 from the solvent mixture AB3. The solution mixture is directed for further processing 5.

The hemicellulose-containing solvent mixture AB1, which is separated from the fibre pulp, and the hemicellulose-containing solvent mixture AB3, which is separated from the precipitated cellulose, are ultrafiltered together or separately 5, to separate and concentrate the hemicellulose into the retentate, whereas the bulk of the solvent mixture, being essentially hemicelluloses-free, ends up in the permeate flow 8, after which the mixture ratio of the solvents A and B in the retentate, is changed in order that the bulk of the hemicelluloses in this solvent mixture AB4 is precipitated 9.

In one embodiment, the hemicellulose-poor permeate in the ultrafiltration is added into the compressed fibre pulp, in order to extract the hemicelluloses in the fibre pulp, and to remove them to the solvent mixture, after which the fibre pulp is recompressed to a dry matter percentage of 40-52%, and the separated solvent mixture is directed to ultrafiltration, in order to separate the hemicelluloses.

The precipitated hemicelluloses are separated from the solvent mixture for further processing and the solvent mixture AB4 is directed, together with the permeate in the ultrafiltration, to an evaporation step, in which solvent B is separated from solvent A by evaporation and by condensation of solvent B, and the separated and recovered solvent A is reused 10 to form the solvent mixtures.

In one embodiment, the water contents in the solvent mixtures, which are used in the process, are the following:
a) the water content in the solvent mixture AB1 is 12-22% by weight;
b) the water content in the solvent mixture AB2 is 0-10% by weight;
c) the water content in the solvent mixture AB3 is 10-20% by weight; and
d) the water content in the solvent mixture AB4 is 25-35% by weight.

As described above, standard hemicellulose-rich pulp, such as paper pulp, can be used as the initial material, i.e. as the pulp (chemical fibre mass). Such a fibre pulp comprises for example at least 7%, for example at least 10% hemicellulose, calculated based on the dry weight. Preferably, the percentage of hemicellulose of the polysaccharides in the fibre pulp is approximately 10-30%.

The fibre pulp used in the present technology can be produced from wood or grasses, by using chemical cooking. The wood material can be softwood or hardwood, examples of which are pine, spruce, birch, aspen, poplar, eucalyptus or mixed tropical hardwood, and examples of grasses are hemp, straw, bamboo, reed canary grass, reed and meadow fescue and goat's rue, but these are of course only examples.

Cooking methods which are known per se, are suitable for producing fibre pulp; in the cooking it is possible to use conventional chemicals that remove lignin, at alkaline, acidic or solvent-based (organosolv) conditions.

Examples of methods which are suitable for producing fibre pulp are sulphate cooking, polysulphide cooking, soda cooking, sulphite cooking and formic acid cooking, and other organosolv cookings, but these examples do not in any way restrict the invention. A variety of additional chemicals, such as anthraquinone, can be used in the cooking. It is also possible to combine different lignin-removing cooking reaction steps, by using multi-stage cookings. After cooking, delignification can be continued in oxygen delignification. Delignification of the treated pulp is completed in the bleaching stage.

Most suitably, the pulp to be treated is bleached. Therefore, its lignin content is low or very low. Typically, the lignin content is less than 1%, especially 0.5% or less, calculated based on the dry weight of the pulp.

Based on the properties of a regenerated polysaccharide product, which is produced in one non-restrictive embodiment, the properties of the fibre pulp which is fed into the process are modified to better suit the end product. An example of such a solution is an application, in which the degree of polymerisation of the cellulose in the fibre pulp is modified to correspond to the degree of polymerisation of the regenerated cellulose product. Thus, the initial viscosity of the pulp can be, for example, lowered before treatment by 1-75%. In one non-restrictive special embodiment, the intrinsic viscosity of the fibre pulp, which is 800-1100 $cm^3/g$, is reduced to 400-750 $cm^3/g$, for example 400-550 $cm^3/g$, before treatment. The initial value is typical for example for paper pulp and the latter value represents a most typical viscosity value in production processes of regenerated products.

The following non-limiting example illustrates the invention:

EXAMPLE

Paper pulp which is produced using the softwood sulphate method, and the ISO brightness of which is 89% and the hemicellulose percentage is 17.0% (8.0% glucomannan and 9.0% xylan) and the cellulose percentage is 83.0%, is taken from the high consistency pulp storage tower in the form of a suspension, and then pressed to a dry matter percentage of 42%. The water which is released in pressing is used as process water in the bottom dilution of the storage tower. Into the pressed paper pulp is added, while stirring, concentrated approximately 100% [emim][OAc] liquid in such a way that the water, which is carried with the pressed paper pulp, is mixed into the [emim][OAc], and then forms, around the fibres in the paper pulp, a liquid phase, in which the percentage of water is 19% by weight and of [emim][OAc] 81% by weight. The pulp fibres are allowed to be in contact with the surrounding liquid phase, at the generated fibre consistency of approximately 10%. The liquid also penetrates into the fibre wall, in which case approximately 99% of the hemicellulose in the fibres is dissolved, and the hemicelluloses are transferred into the surrounding fluid.

After that, the mixture of the fibres and the liquid surrounding them is directed to a press, and when the fibre pulp is pressed to a dry matter percentage of 45%, the main part, i.e. approximately 87% of the dissolved hemicellulose, ends up in the compression filtrate which is to be separated. The pressed fibre pulp, in turn, which comprises carbohydrates, 2.9% of which are hemicelluloses and 97.1% is cellulose, and the liquid of which comprises 19% water and 81% [emim][OAc] is directed to dissolving stage of the cellulose. In the dissolving stage, concentrated approximately 100% [emim][OAc] is added, while stirring, into the compressed fibre pulp. The purpose is to generate a carbohydrate solution which has a concentration of over 10%, preferably, however, 15-20%.

Excess water is removed at the dissolving stage of the cellulose by evaporation of water and, at the same time, any air bubbles are removed from the solution. The resulting cellulose polymer solution is stored under controlled conditions in order to even out the quality, and possible impurities are removed from it by filtration. The dissolved polymers are regenerated into fibres by directing the solution, which comprises cellulose polymer, through a spinning nozzle into a bath having a water content of 19-25%, in which case the long-molecular cellulose is precipitated into the spin bath. Countercurrent washing of the regenerated cellulose is carried out to generate pure water which is introduced into the spin bath.

A mixture [emim][OAc] and water is removed from the spin bath, which mixture comprises small amounts of dissolved hemicelluloses and low molecular cellulose. This solution is then directed to the regeneration of the [emim][OAc], into which is also directed the hemicellulose-containing pressing mixture, which is generated from the pressing of the fibre pulp. In the regeneration, the mixture of water-[emim][OAc] is purified by ultrafiltration. In the ultrafiltration, the hemicellulose solution is concentrated to approximately 8-10%, and the hemicelluloses are precipitated by dilution with water in order that the water percentage in the liquid mixture after dilution is 80% and the [emim][OAc] percentage 20%.

The precipitated hemicelluloses are separated in a centrifuge and then dried. The separated hemicellulose is macromolecular. The average molecular weight Mw is approximately 35 kDa and the polydispersity is approximately 1.9.

The filtrate generated in the centrifuge is directed to a second step of regeneration of the [emim][OAc], in which step also the permeates, which have passed through the membranes in the ultrafiltration, are collected. In this second regeneration step, the water is evaporated off the [emim][OAc], which is reused.

The present invention can be industrially used, for example for producing regenerated products from lignocellulose-containing carbohydrate material, such as cellulose and hemicellulose. Examples of such products are fibres, including staple fibres, hemicellulose polymers, hemicellulose oligomers and hemicellulose monomers, and it is possible to further produce, for example, fine chemicals or ethanol, of the latter ones.

From the lignocellulose raw material it is possible to produce optionally, among others, hemicellulose-rich fibre pulp or, correspondingly, hemicellulose-poor fibre pulp, which pulps are suitable for different end-use applications.

As an alternative to traditional base extractions, it is possible to use the present method for the fractionating of lignocellulose material, in which case the depolymerisation during the separation and fractionation remains very insignificant. For this reason, the method is also suitable for research purposes.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A method of producing regenerated cellulose and hemicellulose from a cellulose and hemicellulose containing fibre pulp prepared by chemical cooking from lignocellulosic material, wherein the hemicellulose and the cellulose, respectively, are separated from the fibre pulp into separate fractions, the method comprising:

dissolving the hemicellulose in the fibre pulp by mixing the fibre pulp into a water-miscible organic solvent selected from N-methylmorpholine-N-oxide and an ionic liquid or an aqueous solution thereof to generate a first solution which comprises mainly dissolved hemicellulose, dissolving the cellulose in the remaining fibre pulp from the first step by mixing the fibre pulp into the water-miscible organic solvent or its aqueous solution to generate a second solution which comprises mainly dissolved cellulose, wherein the water content in the first solution is higher than the water content in the second solution, precipitating the hemicellulose from the first solution to produce regenerated hemicellulose by increasing the water content in the first solution, and precipitating the cellulose from the second solution to produce regenerated cellulose, by increasing the water content in the second solution.

2. The method according to claim 1, wherein the percentage of hemicellulose is approximately 10-30% of the polysaccharides in the fibre pulp.

3. The method according to claim 1, wherein the hemicellulose to be precipitated is polymeric, having an average molar mass higher than 15,000 g/mol.

4. The method according to claim 1, wherein, when the precipitated cellulose is formed as fibres, beads, and various particles or films.

5. The method according to claim 1, wherein the ionic liquid is selected from the group consisting of an imidazolium-based ionic liquid selected from [bmim]Cl, (1-butyl-3-methyl-imidazolium chloride), [emim][OAc] (1-ethyl-3-methyl-imidazolium acetate) and [emim][Me$_2$PO$_4$] (1-ethyl-3-methyl-imidazolium-dimethyl phosphate), or a mixture thereof, and a conjugated acid, which comprises an organic base, selected from 1,1,3,3-tetramethyl-guanidine (TMG), 1,1,2,3,3-pentamethyl-guanidine (PMG) and 1,8-diazabicyclo [5.4.0] undec-7-ene (DBU), which comprises inorganic or organic conjugated acids, selected from carboxylic acids, hydrochloric acid, methyl dihydrogen phosphonate, dimethyl hydrogen phosphate and phosphinic acid.

6. A method of treating fibre pulp, which is prepared by chemical cooking from lignocellulose material and which comprises cellulose and hemicellulose, which method comprises forming a composition which comprises solid particles of fibre pulp suspended in water in the first step, adding to said composition a solvent that comprises N-methylmorpholine-N-oxide or an ionic liquid, such that said solvent has a first concentration relative to water, whereby hemicellulose in the fibre pulp is dissolved into the liquid phase, yielding a solid matter, which mainly comprises cellulose, and a first solution, which comprises dissolved hemicellulose, in the second step, precipitating the dissolved hemicellulose from the first solution, by adjusting the concentration of said solvent to a second concentration relative to water which is lower than the first concentration;

in the third step, contacting the solid matter which comprises cellulose with an aqueous solvent mixture that comprises N-methylmorpholine-N-oxide or the ionic liquid, which has a third concentration relative to water which is higher than the first concentration, whereby the cellulose in the solid matter is dissolved in the aqueous solvent mixture to yield, the dissolved solid matter of which is mainly cellulose, and in the fourth step, precipitating the dissolved solid matter by adjusting the concentration of said solvent to a fourth concentration relative to water which is lower than the third concentration, but higher than the second concentration.

7. The method according to claim 6, wherein the concentration of the N-methylmorpholine-N-oxide or ionic liquid relative to water is is adjusted by increasing or reducing the amount of the N-methylmorpholine-N-oxide or ionic liquid, by increasing or reducing the amount of water, or by a combination of these measures.

8. The method according to claim 7, wherein the water content of the solvent that comprises N-methylmorpholine-N-oxide or ionic liquid is
in the first step, higher than 11% but lower than 23%,
in the second step, higher than 24%,
in the third step, 10% or lower,
in the fourth step, higher than 10%.

9. The method according to claim 6, wherein the hemicellulose is recovered from the precipitate in the third step.

10. The method according to claim 9, wherein the liquid phase which is generated from the first step and which comprises hemicellulose, is ultrafiltrated in order to separate and concentrate the hemicellulose into the retentate, after which the concentration of the solvent in the retentate, relative to the ionic liquid, is changed in order to precipitate the hemicelluloses.

11. The method according to claim 6, wherein the cellulose is recovered from the precipitate in the fourth step.

12. The method according to claim 11, wherein
the solvent is separated from the solid matter,
the separated solvent is divided into N methylmorpholine-N-oxide or ionic liquid and water, and
the N methylmorpholine-N-oxide or ionic liquid is recirculated into the solvent in the second step, and optionally also the first and the fourth step.

13. The method according to claim 12, wherein the water is returned into the solvent in the third step and optionally also the first and the second step.

14. The method according to claim 6, wherein the fibre pulp and the cellulose are enriched, dissolved and regenerated.

15. The method according to claim 6, wherein the fibre pulp to be treated is dried to a dry matter percentage of maximum 52%, and the cellulose pulp is thickened to a dry matter percentage of over 40%, before it is brought into contact with the solvent in the first step.

16. The method according to claim 6, wherein the percentage of hemicellulose is approximately 10-30% of the polysaccharides of the fibre pulp.

17. The method according to claim 6, wherein the hemicellulose is precipitated from the remaining solvent in the fourth step by combining the solvent with the solution in the third step.

18. A method of producing regenerated cellulose and hemicellulose from a cellulose and hemicellulose containing fibre pulp prepared by chemical cooking from lignocellulosic material, wherein the hemicellulose and the cellulose, respectively, are separated from the fibre pulp into separate fractions, the method comprising:
bringing the fibre pulp into contact with the solvent AB1, which is comprised of solvent A, which is N-methylmorpholine-N-oxide or an ionic liquid, and solvent B, which is water, at a mixing ratio, which is capable of dissolving selectively the hemicelluloses to form a hemicellulose solution in AB1 separating solvent AB1 and the hemicelluloses dissolved in it from the fibre pulp,
bringing the fibre pulp into contact with the solvent AB2, which is comprised of the same solvents A and optionally B, at a mixing ratio, which is capable of dissolving the cellulose in the fibre pulp and the hemicelluloses which were undissolved in the first step, whereby the cellulose and hemicelluloses are dissolved,
directing the dissolved fibre material to a space, where a solvent AB3, which is comprised of solvents A and B, is held, whereby the dissolved cellulose, which comes into contact with the mixture, is precipitated, and the dissolved hemicellulose, which comes into contact with the mixture, remains mainly dissolved in the solution, after which the precipitated cellulose is separated from the solvent AB3,
separating the hemicellulose-containing solvent AB1 from the fibre pulp, and separating the hemicellulose-containing solvent AB3 from the precipitated cellulose, ultrafiltrating the solvents AB1 and AB3 together or separately to separate and concentrate the hemicellulose into the retentate, whereby the main part of the solvent mixture ends up, essentially free from hemicelluloses, in the permeate flow,
changing the mixing ratio of the solvents A and B in the retentate, whereby the bulk of the hemicelluloses is precipitated from this solvent AB4,
separating the precipitated hemicelluloses from the solvent mixture and directing the solvent AB4, together with the permeate from the ultrafiltration, to evaporation, where the solvent B is separated from solvent A by evaporation and condensation of solvent B.

19. The method according to claim 18, wherein the fibre pulp is thickened within a dry matter percentage range of 30-52% before being contacted with solvent AB1.

20. The method according to claim 18, wherein the contact between the pulp fibre and the solvent AB1 lasts for at least 10 minutes and takes place at a fibre consistency of 8-15%.

21. The method according to claim 18, wherein the separation of the solvent AB1 from the fibre pulp is carried out by compressing the suspension, which is formed of the fibre pulp and the solvent mixture, to a dry matter percentage of over 40%.

22. The method according to claim 18, wherein hemicellulose-poor permeate from the ultrafiltration is added into the compressed fibre pulp, in order to extract the hemicelluloses in the fibre pulp, and to remove them to the solvent mixture, after which the fibre pulp is re-compressed to a dry matter percentage of 40-52%, and the separated solvent mixture is directed into ultrafiltration, in order to separate the hemicelluloses.

23. The method according to claim 18, wherein the ionic liquid is [emim]OAc.

24. The method according to claim 18, wherein the water content of the solvent AB1 is 12-22% by weight.

25. The method according to claim 18, wherein the water content in the solvent AB2 is 0-10% by weight.

26. The method according to claim 18, wherein the water content in the solvent AB3 is 10-20% by weight.

27. The method according to claim 18, wherein the water content in the solvent AB4 is 25-35% by weight.

* * * * *